United States Patent

Raymond, Jr. et al.

[11] Patent Number: 5,314,165
[45] Date of Patent: May 24, 1994

[54] ROTARY VALVE

[75] Inventors: Frank J. Raymond, Jr., Houston; John R. Dernovsek, Cypress, both of Tex.

[73] Assignee: Bray International, Inc., Houston, Tex.

[21] Appl. No.: 91,765

[22] Filed: Jul. 14, 1993

[51] Int. Cl.⁵ .............................. F16K 1/22
[52] U.S. Cl. ...................... 251/305; 251/306; 251/214
[58] Field of Search ............ 251/214, 304, 305, 306

[56] References Cited

U.S. PATENT DOCUMENTS

| | | |
|---|---|---|
| 2,809,060 | 10/1957 | Thompson ............ 251/306 X |
| 3,376,014 | 4/1968 | Buckley et al. |
| 3,447,780 | 6/1969 | Hobson, Jr. |
| 3,837,620 | 9/1974 | Malloy et al. |
| 4,146,206 | 3/1979 | Malloy et al. |
| 4,273,308 | 6/1981 | Nakai ...................... 251/214 X |
| 4,630,636 | 12/1986 | Cutcher .................. 251/214 X |

FOREIGN PATENT DOCUMENTS 2178511 2/1987 United Kingdom.

Primary Examiner—John C. Fox
Attorney, Agent, or Firm—Vaden, Eickenroht, Thompson, Boulware & Feather

[57] ABSTRACT

There is disclosed a butterfly valve having a disc whose stem portions on its opposite ends are closely received within openings in opposite faces of the disc and a seat in the body of the valve. A seal assembly is mounted between the faces in surrounding relation to the stem portions so as to prevent the entry of line fluid into the openings.

18 Claims, 3 Drawing Sheets

ROTARY VALVE

This invention relates generally to improvements in rotary valves having a closure member whose stem portions on its opposite ends are closely received within openings in the body of the valve to permit it to be rotated between opened and closed positions. In one of its novel aspects, the invention relates to a butterfly valve, although it is contemplated that, in accordance with the broader aspects of the invention, the valve may be of another type, such as a plug or ball valve.

The valve of the present invention has particular utility in the control of line fluids which are highly corrosive and which would damage the stem portions or other parts of the valve unless the latter were protected therefrom. Thus, butterfly valves intended for this service frequently have seats of Teflon or other corrosion-resistant materials which fit within the outer, tubular metal member of the valve body connectible in the flowway and with which the periphery of the disc engages to close the valve. In some cases, the disc itself may be covered with Teflon or the like, although the bigger concern is with protecting the metal stem portions and the openings in the metal portions of the body in which the stem portions are closely received, as well as in protecting a seal and bearing assembly ordinarily carried in a counterbore of one of the body openings for one stem portion whose outer end is connected to an actuator.

It is the primary object of this invention to provide a valve of this type in which the stem portions are protected against corrosive or other damaging effects of the line fluid by seal assemblies which are themselves protected therefrom.

A further object is to provide a butterfly valve of this type in which the seat and disc are so arranged and constructed as to facilitate assembly and disassembly of the valve with the seal assemblies installed on the disc.

These and other objects are accomplished, in accordance with the illustrated embodiment of the invention, by a rotary valve of the type described having an assembly sealing between the closure member and valve body which is in surrounding relation to each of the stem portions, and which includes an outer, essentially U-shaped ring of corrosion-resistant material having flexible legs extending radially inwardly from its closed end for disposal adjacent opposite faces of the body and closure member, and an inner ring disposed between the legs of the outer ring to yieldably urge their outer faces against said opposite faces. Thus, the pressure of the line fluid acts over the closed end, rather than the open end, of each outer ring so as to protect not only the stem portions and associated parts of the valve body, but also the inner ring which self-energizes the assembly into sealing engagement with the body and closure member by yieldably urging the legs against the opposite faces of the body and closure member. Hence, the second ring may be of conventional construction, such as a coil spring or an O-ring of rubber or other elastomeric material, which might otherwise be damaged by the line fluid.

Preferably, however, the inner sides of the legs of the outer ring are tightly engaged with one another to enclose the inner ring and thus protect it against fluids which might leak past the legs of the outer ring, or for that material, fluids or other materials downstream of the seal assembly. As illustrated, the radially inner end of the outer ring is closely adjacent the stem portion it surrounds, whereby the seal assembly may be of minimum diameter.

In one embodiment of the invention, the face of the valve body has an annular recess in which each outer ring is partially received. In another embodiment, the face of the closure member has a recess in which each outer ring is partially received, and, in still another, the faces of each of the body and closure member have recesses in which the outer ring is received. As also illustrated, one or both of the faces of the body and closure member may be flat or spherically shaped.

In the illustrated embodiment of the invention, the valve is a butterfly valve wherein the body includes a tubular member connectible in a flowline and a seat about the inner diameter of the tubular member which is preferably of a corrosion-resistant material which provides a flowway therethrough with which the periphery of the disc is engaged to close the flowway. As also shown, the outer legs of the outer ring are disposed adjacent opposite faces of the inner diameter of the seat and periphery of the disc formed in the faces of the disc.

In the preferred and illustrated embodiment of the butterfly valve, each face of the seat has a spherical surface formed on the inner diameter of the seat which surrounds the opening therein, and each face of the periphery of the disc has a matching spherical surface which surrounds the opening therein for closely engaging the spherical surface of the face of the seat. When removed from the tubular member, the seat is diametrically contractible so that the disc may be installed or removed along with the sealing assembly by lateral movement of its periphery into or out of the seat, when its spherical surface is angularly disposed to the spherical surface on the seat and then rotated into or from a position in which such spherical surfaces are engaged to wedge the legs of the outer ring toward the inner legs thereof.

In the drawings, wherein like reference characters are used throughout to designate like parts:

Figure 10A:
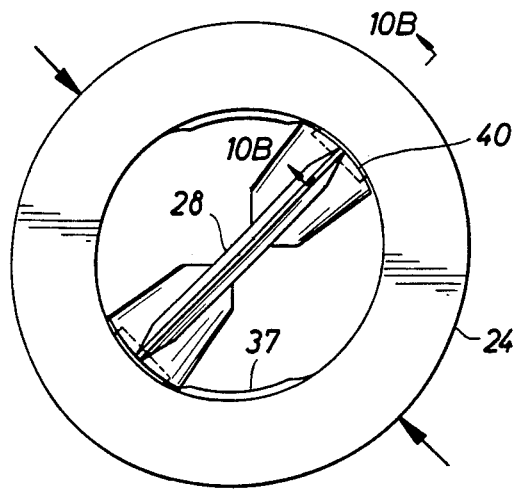
Figure 10B:
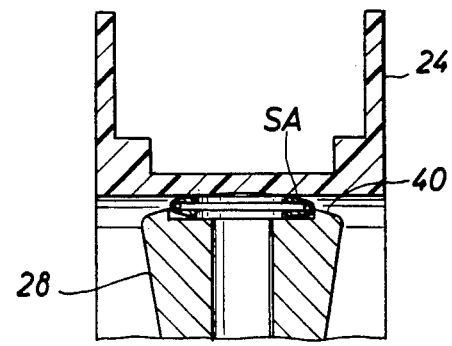
Figure 11A:
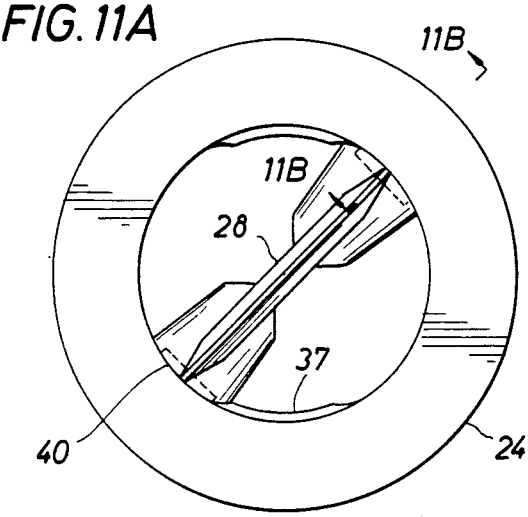
Figure 11B:
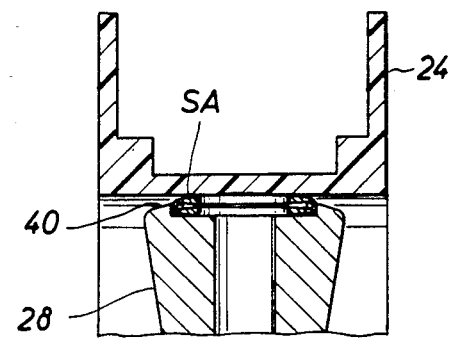
Figure 12A:
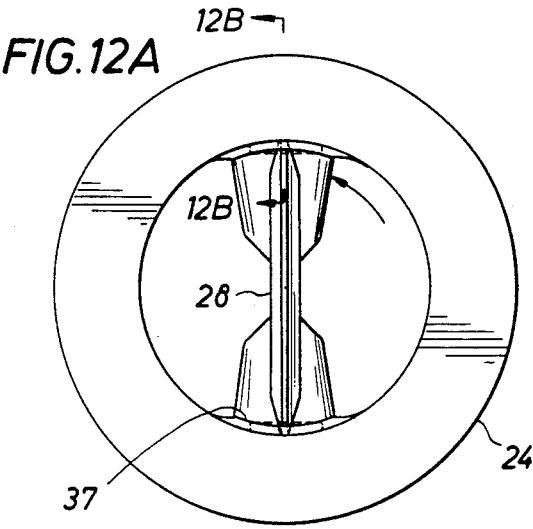
Figure 12B:
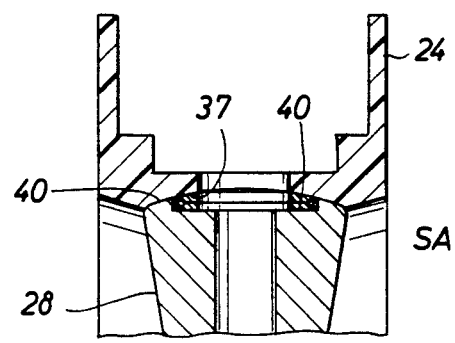

FIG. 10A is a view from one end of the disc and seat removed from within the metal tubular member of the body and with the seat diametrically distorted, as indicated by arrows, to permit the disc to be moved laterally into the periphery of the seat, the disc having been rotated to a position in which its end faces are to one side of the raised spherical surfaces of the faces on the inner periphery of the seat;

FIG. 10B is an enlarged cross-sectional view of a part of the seat and disc, as indicated at broken lines 10B—10B of FIG. 10A;

FIG. 11A is another end view of the seat and disc, as seen in FIG. 10A, but upon relief of the distortion of the seat;

FIG. 11B is a cross-sectional view of the seat and disc as shown along broken lines 11B—11B of FIG. 11A;

FIG. 12A is another view of the end of the seat and disc, but with the disc rotated in a counterclockwise direction, as indicated by the arrow, to cause the spherically shaped surfaces on its faces to be moved into tight engagement with the spherical surfaces of the faces of the seat; and FIG. 12B is an enlarged vertical sectional view of a portion of the seat and disc, as seen along broken lines 12B—12B of FIG. 12A, and showing the seal assembly in sealing engagement with both the seat and disc.

With reference now to the details of the above described drawings, the over-all valve, which is indicated in its entirety by reference character 20, includes a valve body 21 having an outer tubular metal member 22 whose opposite ends may be connected in a flow line. The tubular member is made up of diametrically split parts 22A and 22B releasably connected to one another by bolts 22C, and a neck 23 which extends radially upwardly from the upper part 22A.

The body 21 also includes an annular seat 24 of Teflon or other corrosion-resistant material which is disposed about the inner periphery of the tubular member 22 so as to form a corrosion-resistant flowway 25 through the valve body. The seat has outwardly extended flanges on each end which are clamped between the opposite ends of the tubular member 23 and tubular parts of the flow line to form a continuation of the flowway 25. The outer diameter of the seat 24 has a recess 26 thereabout which receives a diametrically split ring 27 of rubber or other elastomeric material which is contained between the recess and the inner diameter of the tubular member 23 to provide a resilient backup for the seat 24 so as to facilitate the tight sealing engagement of the periphery of the disc with the relatively non-elastic material of the seat.

Figure 1:
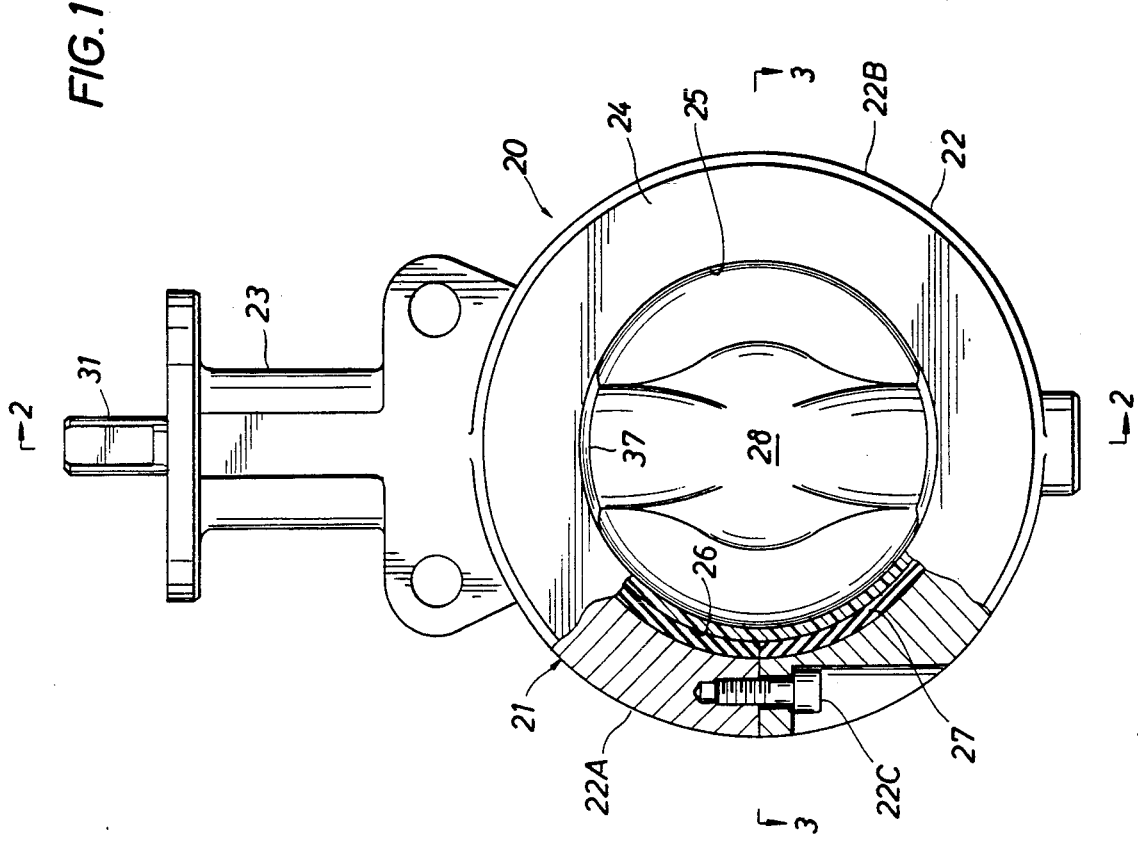
FIG. 1 is an end view, broken away in part, of a butterfly valve constructed in accordance with the present invention and with its disc disposed in its closed position.

Valve 20 further includes a metal disc 28 which, if desired, may be covered with Teflon or other corrosion-resistent material. Each split part of the tubular member, the seat, as well as the rubber ring 27, are provided with aligned openings which, in turn, are aligned with openings formed in surrounding faces on the upper and lower ends of the disc so as to receive upper and lower stem portions 29 and 30. In the illustrated embodiment of the invention, the stem portions are individual stems received closely within individual openings in the disc and body whereby the disc is adapted to be rotated about the axis of the stem between the closed position of FIGS. 1 and 2 and an open position in which the disc is disposed at substantially 90° to that shown. Obviously, however, the stem portions may be opposite ends of a single stem within a through opening in the disc.

The opening in the upper part of the tubular member of the body extends through it to permit the stem portion 29 to extend therethrough, and an actuator (not shown) may be mounted on the flange 30' on the upper end of the neck for attachment to the outer end 31 of the stem portion 29 to permit it to be rotated by the actuator. For this purpose, the disc is connected to the upper stem by a spline or the like. A bearing and seal assembly 32 is mounted within a counterbore 33 in the outer end of the opening in tubular member part 22A for stem portion 29, so as to surround the stem portion 29 adjacent its upper end, and is held down by means of a snap ring 34.

In order to disassemble the valve, it's merely necessary to disconnect the parts 22A and 22B and permit them to be pulled away from the seat, along with the stem portions 29 and 30. Obviously, the reconnection of the parts 22A and 22B permits the stem portions and tubular member to be reassembled on the seat and disc. The disc may be installed within or removed from the seat in a manner to be described hereinafter.

As previously described, and as shown in the drawings, a seal assembly SA is mounted between a face 35 of the inner periphery of the seat and a face 36 on each end of the disc for sealing between them in surrounding relation to one of the stem portions. More particularly, the seal assemblies are mounted between the opposite faces 35 and 36 so as to exclude the passage of line fluids into the openings and, thus, to the stem portions in which they are received, as well as the bearing and seal assembly.

As shown, each of the faces 36 on the disc is formed on the end of a radially enlarged portion of the disc, while each of the faces 35 on the seat is formed on the end of a matching portion thereof. In both cases, the faces have spherical surfaces, as indicated by the radius "R" shown in FIG. 2, which surround the openings in the seats and disc, and which are moved into engagement during assembly of the disc in the seat, as will be described to follow. The outer periphery of the disc intermediate the faces 36 on each end is relatively thin for engaging a spherical surface (see FIG. 3) formed about the inner periphery of the seat to connect with the spherical surfaces of the faces of the seats. The inner periphery of the seat on each side of this spherical surface is essentially cylindrical so as to provide the largest possible opening into the periphery intermediate the raised edges 37 on opposite sides of each spherical face.

Figure 2:
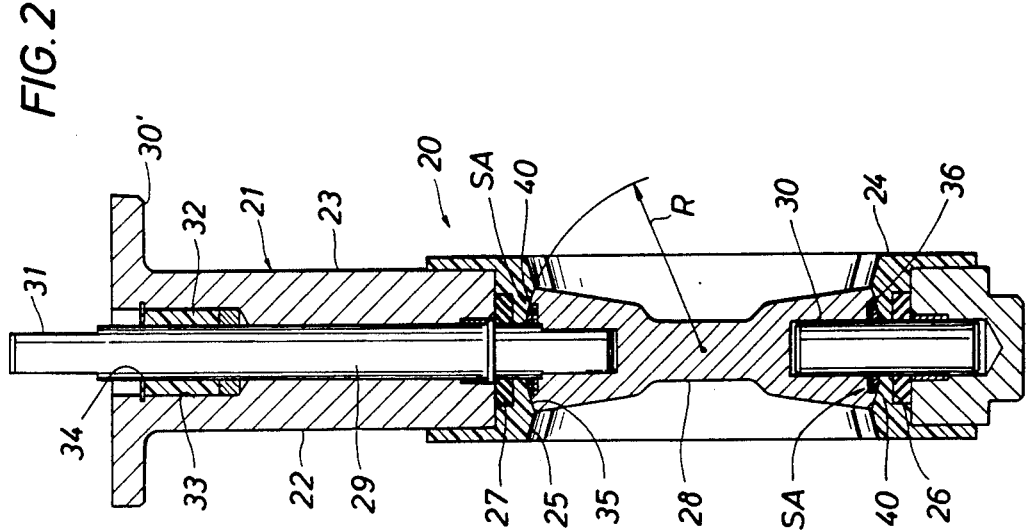
FIG. 2 is a vertical sectional view of the valve of FIG. 1, as seen along broken lines 2—2 thereof.
Figure 3:
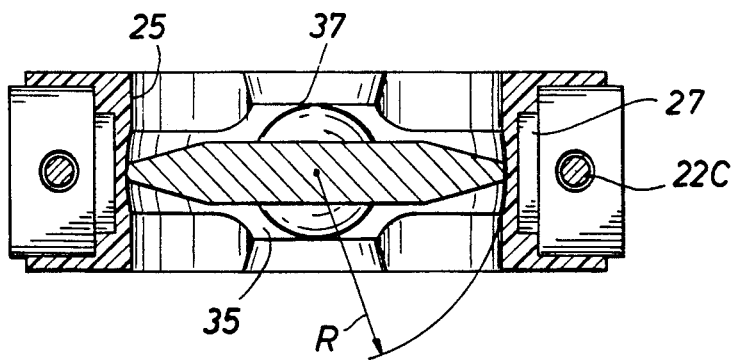
FIG. 3 is a cross-sectional view of the valve of FIG. 1, as seen along broken lines 3—3 thereof.
Figure 7:
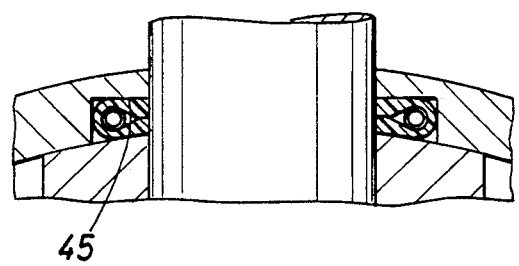
FIG. 7 is a view of the seal assembly received within a recess in the seat in accordance with still another embodiment of the invention.
Figure 5:
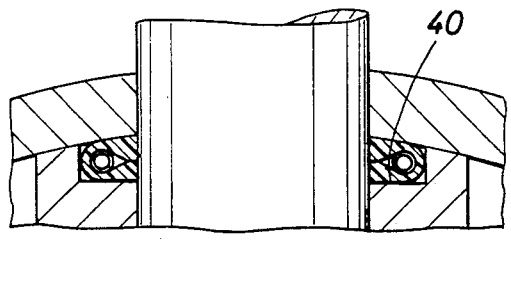
FIG. 5 is an enlarged cross-sectional view of a part of the valve showing the seal assembly received within a recess in the face of the disc in surrounding relation to one of the stem portions.
Figure 8:
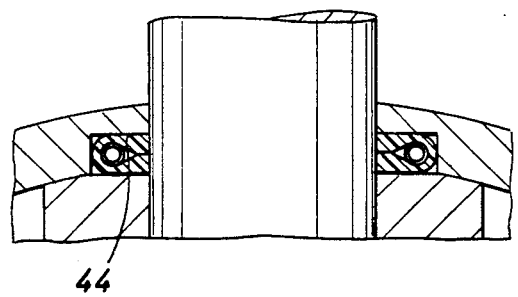
FIG. 8 is a view of the seal assembly received within a recess in the seat in accordance with a further embodiment of the invention.
Figure 6:
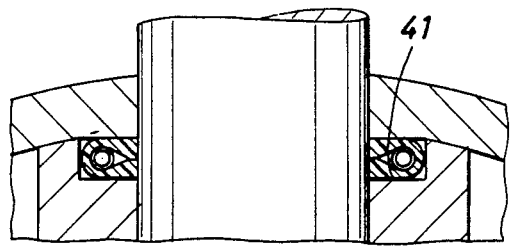
FIG. 6 is a view of the seal assembly received within a recess in the disc in accordance with another embodiment of the invention.
Figure 9:
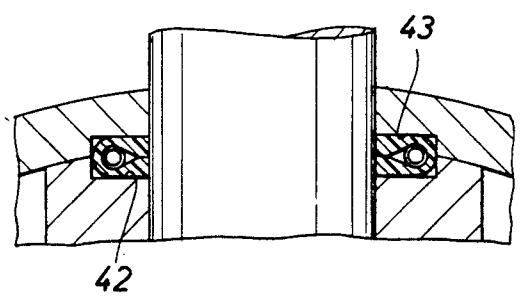
FIG. 9 is a view of the seal assembly received partially within recesses in each of the seat and disc in accordance with a still further embodiment of the invention.

As shown in FIGS. 2 and 5, as well as in FIGS. 10B, 11B and 12B, each seal assembly SA is received within a recess 40 formed in a face of the disc having a bottom wall which is flat. In an alternate embodiment of the invention, as shown in FIG. 6, the seal assembly is also received in recess 41 in the face of the disc, but with the oppositely facing face of the seat also being flat. In accordance with the embodiment of the invention of FIG. 9, the seal assembly may be received partly within recesses 42 and 43 in the opposite faces of the disc and seal assembly, respectively, with each having flat bottom walls. In the case of FIG. 8, the seal assembly is shown to be received in the recess 44 formed in the seat, with the bottom wall of the recess as well as the oppositely facing surface of the disc being flat. In FIG. 7, on the other hand, the recess 45 for the seal assembly is also shown to be formed in the face of the seat, but in this case the opposite face of the disc is spherical. As will be understood from the description to follow, the arrangement shown in FIG. 5, and thus in the other figures of the drawings, is preferred inasmuch as it facilitates assembly and disassembly of the disc with respect to the seat.

Figure 4:
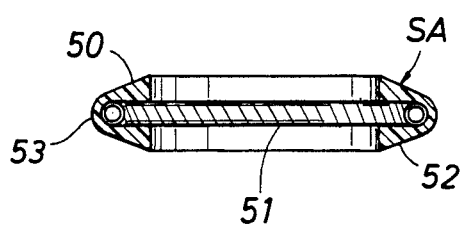
FIG. 4 is an enlarged cross-sectional view of the seal assembly constructed in accordance with the present invention and removed from disposal between the seat and disc.

As previously described, and as best shown in FIG. 4, the seal assemblies SA comprises an outer ring 50 of Teflon or other corrosion-resistant material which is essentially U-shaped, with its legs 52 extending inwardly from its outer closed end 53. As further described, the seal assembly also includes an inner ring 51 disposed between the legs 52 of the outer ring 50 and of a spring-like material for yieldably urging the legs outwardly and thus into tight engagement with the faces of the disc and seat when disposed therebetween. For this purpose, and as shown, the inner ring 51 may be a coil spring. Alternatively, for example, the spring 51 may be an O-ring of rubber or other elastomeric material. In any case, the legs of the outer ring are of such thickness and the recess or recesses in which the seal assembly is received are of such depth that, when the seal assembly is mounted between them, the inner sides of the legs 52 are brought into engagement with one another. As previously mentioned, this encloses the inner ring 51 and thus provides further protection from the corrosive effects of the line fluid.

Thus, the seal ring SA is self-energized in that the outer sides of the legs 52 are yieldably urged into tight engagement with the opposite faces of the disc and seat, thereby maintaining a seal between the seat and disc which prevents the passage of line fluid. This seal assembly construction thus differs substantially from conventional seal assemblies of the type in which the legs of an essentially U-shaped outer ring extend radially outwardly, rather than inwardly, and wherein the legs of the outer ring are yieldably urged against opposing surfaces only for the purpose of providing initial contact, with the entry of line fluid into the open end about the outer diameter of the outer seal ring providing the force for yieldably urging the legs into sealing engagement with the opposite surfaces. In this latter case, of course, there would be no enclosure of the inner ring, and thus no means for protecting it from the corrosive effects of the line fluid in the event it should leak past the closed end of the outer ring.

With reference now to the preferred method of assembling the valve, as illustrated in FIGS. 10A-10B, 11A-11B, and 12A-12B, the metal tubular members of the valve body are disconnected from one another and removed, along with the rubber ring 27, from about the seat 24. This permits the seat to be diametrically distorted, as indicated by the arrows in FIG. 10A, whereby the flowway through the seat is elongated in a direction angularly disposed with respect to the axis of the openings through the seat. With the seal assembly mounted in the recess thereof, the disc 28 is then moved laterally into the flowway with the axis of the openings through it extending in the oblong direction and thus angularly disposed with respect to the openings through the seat. This facilitates movement of the spherical surfaces on the faces of the disc and the seal assembly into the flowway through the seat due to the clearance between the faces of the disc and the flowway to the side of the raised edges 37 of the faces of the seat. As shown in FIG. 10B, the inner sides of the legs of the outer ring of the seal assembly are spaced from one another at this point, but nevertheless held in place as they slide laterally into the flowway of the seat.

As shown in FIGS. 11A and 11B, as the distortion of the seat is released, its inner periphery moves radially inwardly against the outer legs of the seal assemblies, thus causing them to move toward the inner legs thereof. Nevertheless, there is still some space between the faces of the disc and the flowway through the seat until the disc is rotated in a counterclockwise direction, as indicated by the arrow in FIG. 12A, so as to permit the seal assemblies and faces 40 of the disc to move onto the spherical surfaces of the raised faces 37 of the seat, thus moving both the seal assembly and disc into positions in engagement with the spherical surfaces of the seat faces, as shown in FIG. 12B. As this occurs, the outer legs of the seal assemblies are moved inwardly to cause their inner sides to engage the opposite sides of the inner legs of the seal assemblies, as best shown in FIG. 8, thereby enclosing the inner ring of the seal assembly within the outer ring thereof. At this time, of course, the valve is ready for further assembly by movement of the stem portions 29 and 30 into the aligned openings in the disc and seat, and disposal of the rubber ring 37 about the outer recess of the seat, and connection of the split metal tubular members 22A and 22B about the seat and rubber ring, as they are moved into connection with one another over the assembled stems.

Obviously, the valve may be disassembled, as, for example, to permit replacement or repair of the seat assembly, by a reversal of this process.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A rotary valve, comprising
    a valve body having a flowway therethrough,
    a closure member having stem portions on its opposite ends closely received within openings in the valve body to permit the closure member to be rotated between positions opening and closing the flowway, and
    an assembly sealing between the closure member and valve body in surrounding relation to each of the stem portions, including
        an outer, essentially U-shaped ring of corrosion-resistant material having flexible legs extending radially inwardly from its closed end for disposal adjacent opposite faces of the body and closure member, and
        an inner ring disposed between the legs of the outer ring to yieldably urge their outer faces against said opposite faces.
2. As in claim 1, wherein
    the inner faces of the legs of the outer ring are tightly engaged with one another to enclose the inner ring.
3. As in claim 1, wherein
    the radially inner end of the outer ring is closely adjacent the stem portion it surrounds.

4. As in claim 1, wherein the face of the valve body has an annular recess in which each outer ring is partially received.

5. As in claim 1, Wherein the face of the closure member has a recess in which each outer ring is partially received.

6. As in claim 1, wherein the faces of each of the body and closure member have recesses in which the outer ring is received.

7. As in claim 1, wherein the inner ring is a coiled spring.

8. As in claim 1, wherein the inner ring is an 0-ring of elastomeric material.

9. As in claim 1, wherein the faces of the body and closure member are spherically shaped.

10. A butterfly valve, comprising
a body including a tubular member connectible in a flowline and a seat about the inner diameter of the tubular body to provide a flowway therethrough,
a disc member having stem portions at its opposite ends closely received within openings in the tubular member and seat of the valve body to permit the disc to be rotated between a position opening the flowway and a position in which its periphery is engaged with the inner diameter of the seat to close the flowway, and
an assembly sealing between the disc and the seat in surrounding relation to each of the stem portions, including
an outer, essentially U-shaped ring of corrosion-resistant material having flexible legs extending radially inwardly from its closed end for disposal adjacent opposite faces of the inner diameter of the seat and periphery of the disc, and
an inner ring disposed between the legs of the outer ring to yieldably urge their outer faces against said opposite faces.

11. As in claim 10, wherein the inner faces of the legs of the outer ring are tightly engaged with one another to enclose the inner ring.

12. As in claim 10, wherein the radially inner end of the outer ring is closely adjacent the stem portion it surrounds.

13. As in claim 10, wherein the face of the seat has an annular recess in which each outer ring is partially received.

14. As in claim 10, wherein the face of the periphery of the disc has a recess in which each outer ring is partially received.

15. As in claim 10, wherein the faces of each of the seat and periphery of the disc have recesses in which the outer ring is received.

16. As in claim 10, wherein the inner ring is a coiled spring.

17. As in claim 10, wherein the inner ring is an O-ring of elastomeric material.

18. As in claim 10, wherein
the tubular member comprises diametrically split parts, and the stem portions comprise individual stems which are are removable from openings in the faces of the disc,
each face of the seat has a spherical surface on the inner diameter of the seat which surrounds the opening therein,
each face of the periphery of the disc has a matching spherical surface which surrounds the opening therein for closely engaging the spherical surface of the face of the seat, and
said seat is diametrically contractible so that the disc may be installed or removed along with the sealing means by lateral movement of its periphery into or out of the seat, when its spherical surface is angularly disposed to the spherical surface on the seat and then rotated to or from a position in which such spherical surfaces are engaged to wedge the outer legs of the outer ring toward the inner legs thereof.

* * * * *